A. M. BURNS.
SAFETY DEVICE FOR ENDLESS CONVEYERS.
APPLICATION FILED JUNE 5, 1922.
1,437,718.
Patented Dec. 5, 1922.
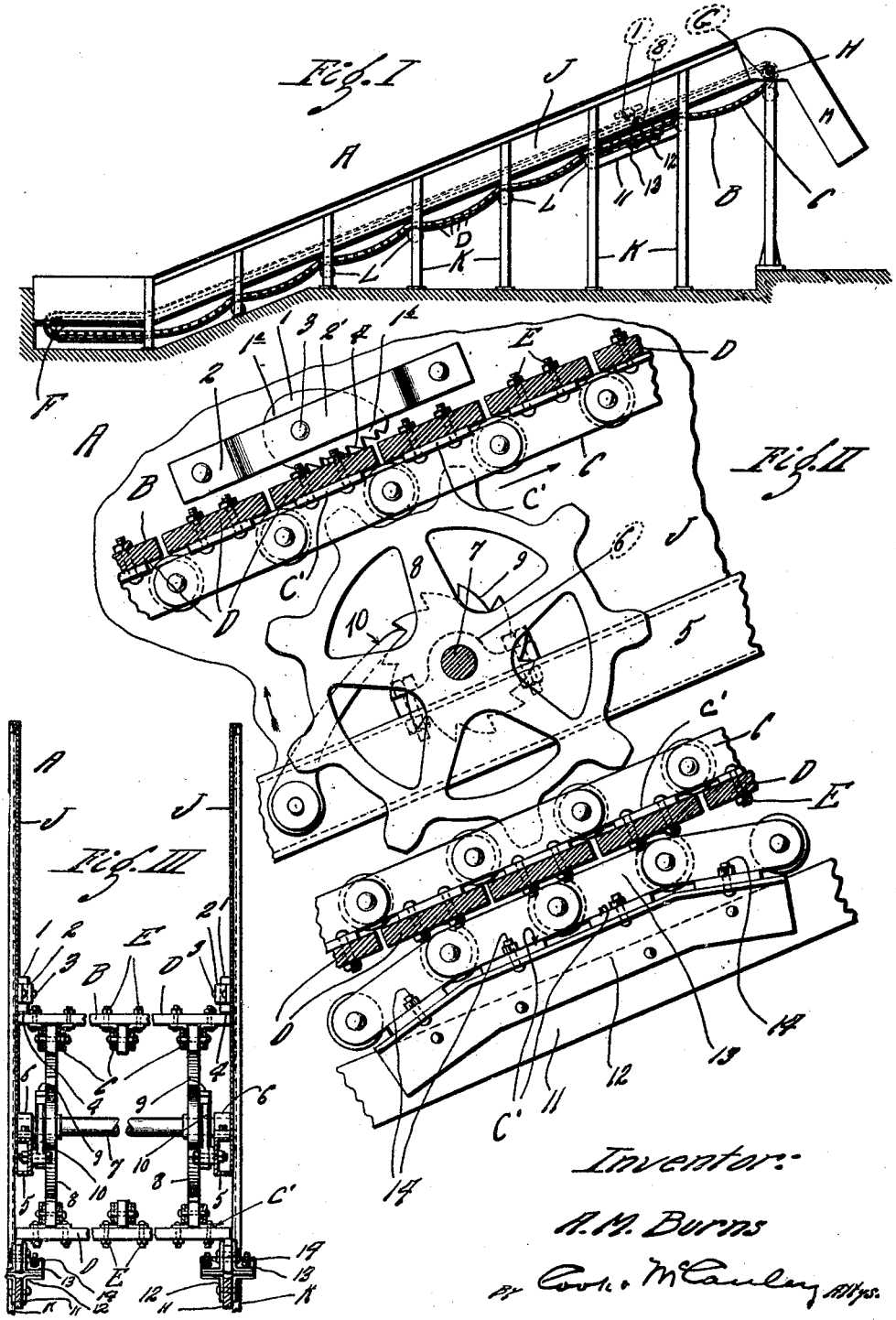

Patented Dec. 5, 1922.

1,437,718

UNITED STATES PATENT OFFICE.

ALBERT M. BURNS, OF CUPEY, CUBA, ASSIGNOR TO FULTON IRON WORKS COMPANY, OF ST. LOUIS, MISSOURI, A CORPORATION OF DELAWARE.

SAFETY DEVICE FOR ENDLESS CONVEYERS.

Application filed June 5, 1922. Serial No. 566,068.

*To all whom it may concern:*

Be it known that I, ALBERT M. BURNS, a citizen of the United States of America, a resident of Cupey, Oriente, Cuba, have invented certain new and useful Improvements in Safety Devices for Endless Conveyers, of which the following is a full, clear, and exact description, reference being had to the accompanying drawings, forming a part of this specification.

This invention relates generally to improvements in safety devices for endless conveyers and more particularly to a safety device for that class of endless conveyer which is employed to carry cane to a crushing apparatus.

In actual practice cane to be crushed for the purpose of extracting the juice therefrom is carried to the elevated crushing rolls on an upwardly inclined, endless conveyer, which usually comprises a plurality of endless chains supporting transverse members to provide an endless apron on which the cane is placed, said endless chains operating over suitable sprocket wheels. The cane is fed onto the conveyer so as to result in a continuous layer of cane moving upwardly to the crushing rolls.

The endless chains of the heavily laden conveyer are subjected to a great strain, particularly when said chain passes over the upper sprocket wheel, and it is a common occurrence for chains to break at this point, thus permitting the conveyer to slide down the incline, thereby resulting in a tangled mass of conveyer parts and cane at the bottom of the carrier.

Much of the time and labor required to reassemble the conveyer and replace the cane thereon in the event that the chains break is saved by the use of the safety device disclosed herein, which cooperates with the conveyer in such manner as to grip and hold same so that said conveyer is prevented from sliding down the incline upon the breaking of a chain.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a side elevation of a cane carrier showing my safety device in place thereon.

Fig. II is an enlarged fragmentary section through the conveyer apron, showing the safety device.

Fig. III is a transverse section through a cane carrier showing the safety device in place thereon.

A designates a cane carrier comprising a flexible endless conveyer B, said conveyer being composed of a plurality of sprocket chains C supporting transverse members D in the form of wood or metal slats, said members D being secured to the links of said chains by any suitable means, such, for instance, as bolts E.

The conveyer B is operable on sprocket wheels F and G, the sprocket chains C meshing with said sprocket wheels. The sprocket wheel G provides the means whereby motion is imparted to the conveyer B, said sprocket wheel being mounted on a power shaft H which is actuated by any suitable power device (not shown).

The conveyer B is interposed between a pair of side members J supported by means of uprights K, thus preventing the cane on said conveyer from being displaced laterally therefrom, and each of said uprights K is provided with a roller L whereby the lower flight of the conveyer B is supported.

The cane is deposited on the endless apron of the conveyer B, at the lower end of said conveyer, and is carried upwardly and discharged into an intake chute M leading to the crusher rolls.

Pivotally secured to the side members J is a pair of dogs 1, one of said dogs being secured to each side member at a point immediately above the apron of the upper flight of the conveyer B. To give to the dogs 1 the required firmness I employ U-shaped members 2, the free ends of each of said U-shaped members being secured to one of said side members J, and the offset portion 2' thereof extending outwardly from said side member to provide a space wherein the dog 1 is mounted. A pivot 3 extends through the portion 2' of the member 2, through an opening in the dog 1, and through the side member J, whereby said dog is pivotally secured in place.

The dogs 1, it will be observed by referring to Fig. II, are irregular in shape, the portion 1ª of each of said dogs being concentric with the pivot 3 and the portion 1ᵇ thereof being eccentric thereto. Teeth 4 are formed at the lower edge of each of said dogs for a purpose to be hereinafter set forth.

Extending longitudinally of each of the side members J is a channel beam 5, said beams being secured to said side members in any suitable manner. Fixed to the beams 5 is a pair of bearings 6 which support a transverse shaft 7, said shaft being free to rotate in said bearings. Mounted upon and secured to the transverse shaft 7 is a pair of sprocket wheels 8, each of which is located adjacent to an outer edge of the conveyer and meshes with the links of the upper and lower flights of one of the endless chains C (Fig. III).

Secured to the transverse shaft 7 adjacent to each of the sprocket wheels 8 is a ratchet wheel 9, said ratchet wheels being adapted to rotate with said sprocket wheels 8 and said shaft 7, each of said ratchet wheels having a pawl 10 associated with it, said pawls being pivotally secured to the channel beams 5 and being adapted to permit said ratchet wheels to rotate in one direction without engaging the teeth thereof, but being so arranged as to engage said teeth to prevent said ratchet wheels from rotating in the opposite direction.

Extending from one of the uprights K to another of said uprights, at points below the sprocket wheels 8, is a pair of connecting members 11, one of said connecting members being located at each side of the carrier A. A member 12 is secured to each of the connecting members 11, said members 12 preferably being short sections of angle bars provided with downwardly inclined end portions. Mounted on each of the members 12 is a supporting device 13 over which the lower flight of the conveyer B passes, whereby the sprocket chains forming a part of said conveyer are retained in mesh with the sprocket wheels 8.

The supporting devices 13 are preferably short pieces of sprocket chain similar to that used on the conveyer, said chains being provided with anti-friction rollers which permit the lower flight of the conveyer to slide over said supporting device with very little friction. Each of the links of the sprocket chains C is provided with laterally extending flanges C′ through which the bolts E pass to secure the transverse members D to said chains, and these flanges C′ are utilized to secure the supporting devices 13 to the members 12, bolts 14 passing through said flanges C′ and through a leg of each of said members 12.

The operation of the safety device is as follows:

Assuming that the conveyer B is loaded with cane and is being operated, the upper flight of said conveyer will be moving in the direction indicated by the arrow in Fig. II, and the toothed portions 1ᵇ of the dogs 1 will ride loosely on the apron of said conveyer. The sprocket wheels 8 which mesh with the sprocket chains C of the conveyer, together with the ratchet wheels 9 and the shaft 7, will under the conditions related above rotate in the direction indicated by the feathered arrow in Fig. II which will permit the teeth of said ratchet wheels to move under the pawls 10 without hindrance therefrom. Assuming now that the sprocket chains break at points between the safety device and the sprocket wheel G, whereupon the upper flight of the conveyer B will start to move in the opposite direction to that in which it normally moves, the downward movement of the conveyer will cause the teeth of the dogs 1 to bite into the transverse members D, the weight of the heavily laden conveyer attempting to draw same downwardly wedging the portions 1ᵇ of the dogs 1 between the pivots 3 and the conveyer apron whereby the teeth of the dogs 1 are firmly imbedded in said transverse members D, thus preventing said conveyer from moving downwardly. The sprocket wheels 8, because they are in mesh with the sprocket chains C, will aid the dogs 1 to prevent the upper flight of the conveyer from moving downwardly, as any movement of said sprocket wheels in a reverse direction to that indicated by the feathered arrow in Fig. II will be arrested by the pawls 10 engaging teeth on the ratchet wheels 9. As the sprocket wheels 8 are in mesh with the sprocket chains forming a part of the lower flight of the conveyer, said lower flight of the conveyer will be prevented from moving as the upper flight will be locked by the dogs 1 and the pawl 10 and ratchet wheel 9, and because the sprocket wheels 8 are locked by said upper flight, the lower flight will consequently be locked. The supporting devices 13 will keep the chains of the lower flight of the conveyer and the sprocket wheels 8 firmly in mesh so that the downward pull of said conveyer will not cause the chains thereof to slide by said sprocket wheels 8.

I claim:

1. A safety device for endless conveyers provided with actuating means whereby same is driven in a fixed direction of travel, comprising gripping means cooperable with said conveyer whereby same is prevented from moving in a reverse direction independent of said actuating means.

2. A safety device for endless conveyers provided with actuating means whereby same is driven in a fixed direction of travel, comprising pivoted gripping means cooperable with said conveyer whereby same is prevented from moving in a reverse direction independent of said actuating means.

3. A safety device for endless conveyers provided with actuating means whereby same is driven in a fixed direction of travel, comprising pivotally arranged, toothed gripping means cooperable with said conveyer whereby same is prevented from moving in a reverse direction independent of said actuating means.

4. A safety device for endless conveyers provided with actuating means whereby same is driven in a fixed direction of travel, comprising a plurality of pivoted dogs provided with teeth adapted to be imbedded in a portion of said conveyer to prevent same from moving in a reverse direction independent of said actuating means.

5. A safety device for endless conveyers provided with actuating means whereby same is driven in a fixed direction of travel, comprising means cooperating with the upper flight and the lower flight of said conveyer whereby same is prevented from moving in a reverse direction.

6. A safety device for endless conveyers provided with actuating means whereby same is driven in a fixed direction of travel, comprising rotatable means cooperating with the upper flight and the lower flight of said conveyer whereby same is prevented from moving in a reverse direction.

7. A safety device for endless conveyers having endless sprocket chains and being provided with actuating means whereby said endless conveyer is driven in a fixed direction of travel, comprising a sprocket wheel meshing with the upper and lower flight portions of a sprocket chain of said endless conveyer, and means associated with said sprocket wheel whereby same is permitted to rotate in one direction but is prevented from moving in the reverse direction.

8. A safety device for endless conveyers having endless sprocket chains and being provided with actuating means whereby said endless conveyer is driven in a fixed direction of travel, comprising a sprocket wheel meshing with the upper and lower flight portions of a sprocket chain of said endless conveyer, and a ratchet wheel and pawl associated with said sprocket wheel whereby same is permitted to rotate in one direction but is prevented from rotating in the reverse direction.

9. A safety device for endless conveyers having a plurality of endless sprocket chains and being provided with actuating means whereby said endless conveyer is driven in a fixed direction of travel, comprising a plurality of sprocket wheels meshing with the upper and lower flight portions of said sprocket chains of said endless conveyer, said sprocket wheels being mounted on a shaft extending transversely of said conveyer, ratchet wheels associated with said sprocket wheels and adapted to rotate therewith, and pawls associated with said ratchet wheels whereby said ratchet wheels and the associated sprocket wheels are permitted to rotate in one direction but are prevented from rotating in the reverse direction.

10. A safety device for endless conveyers provided with actuating means whereby same is driven in a fixed direction of travel, comprising means cooperating with the upper flight and the lower flight of said conveyer whereby same is prevented from moving in the reverse direction, and means whereby said lower flight of the conveyer is retained in engagement with said safety means.

11. A safety device for endless conveyers having endless sprocket chains and being provided with actuating means whereby said endless conveyer is driven in a fixed direction of travel, comprising a sprocket wheel meshing with the upper and lower flight portions of a sprocket chain of said endless conveyer, means associated with said sprocket wheel whereby same is prevented from moving in a direction reverse to the direction of travel of the conveyer, and means having anti-friction rollers over which the lower flight of said conveyer passes whereby said lower flight portion of said sprocket chain is retained in mesh with said sprocket wheels.

12. A safety device for endless conveyers having a plurality of endless chains and being provided with actuating means whereby said endless conveyer is driven in a fixed direction of travel, comprising a plurality of pivoted dogs adapted to engage a portion of said conveyer, a plurality of sprocket wheels meshing with the upper and lower flight portions of said sprocket chains of said conveyer, ratchet wheels associated with said sprocket wheels and adapted to rotate therewith, pawls associated with said ratchet wheels, and supporting means having anti-friction rollers over which the lower flight of said conveyer passes whereby the lower flight portions of said sprocket chains are retained in mesh with said sprocket wheels.

In testimony that I claim the foregoing I hereunto affix my signature.

A. M. BURNS.